Aug. 31, 1965    A. J. BARACKET    3,204,091
LIGHT SOURCE OF CONTROLLABLE INTENSITY
Filed Sept. 5, 1963
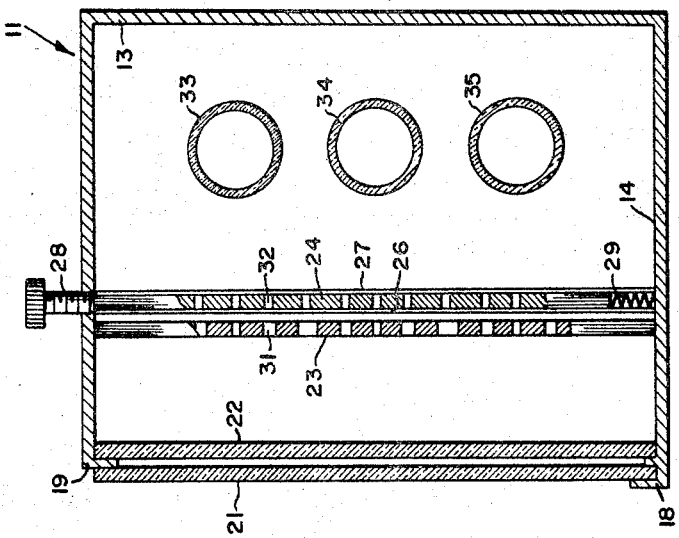
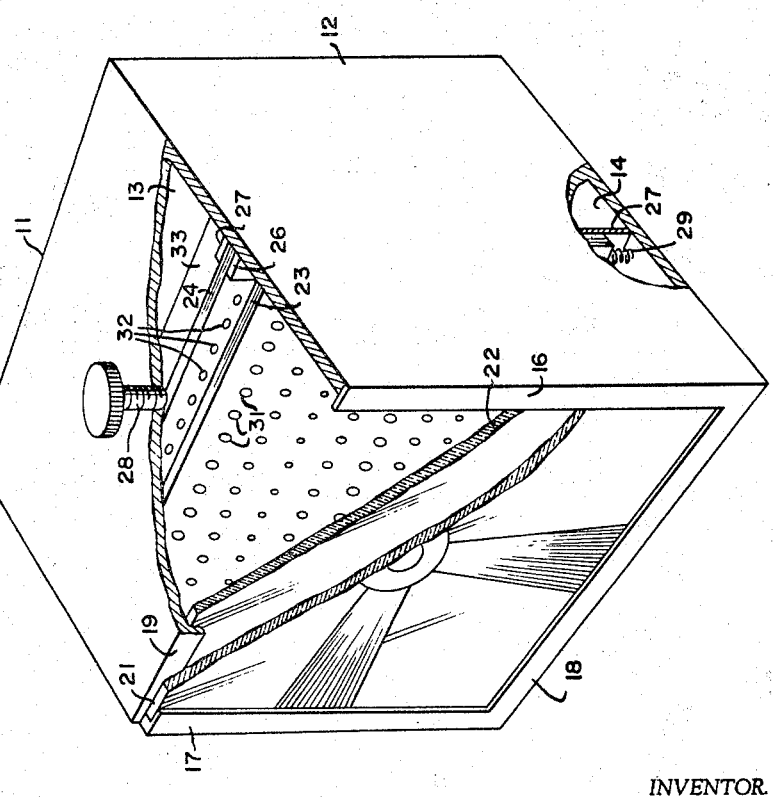
INVENTOR.
ALBERT J. BARACKET
BY Gillette & Virgil
ATTORNEYS

United States Patent Office 3,204,091
Patented Aug. 31, 1965

3,204,091
LIGHT SOURCE OF CONTROLLABLE INTENSITY
Albert J. Baracket, Cedar Grove, N.J., assignor to Diamond Power Specialty Corporation, Lancaster, Ohio, a corporation of Ohio
Filed Sept. 5, 1962, Ser. No. 221,464
3 Claims. (Cl. 240—20)

This invention relates to a light source having means for varying the intensity of the light without changing its color temperature. In particular it relates to a light source for illuminating photographic slides and the like with substantially uniform and controllable intensity over the face of the slide.

In testing television cameras and in presenting photographic slides for television program material it is desirable to provide an even field of illumination and to have some means for varying the intensity of illumination. An electric light must be used to furnish the illumination, but any attempt to change the intensity by varying the voltage or current supplied to the light results in a change in color temperature, if the light is produced by an incandescent bulb, or in erratic operation if the light is produced by other means. A change in color temperature particularly for color slides or color television cannot be tolerated.

In accordance with this invention a light box is provided which is open on one side so that an object to be examined, such as a photographic slide, may be placed over this side. Within the box and at some distance from the open side is a source of light and between the source and the open side are two foraminous members, one of which is movable relative to the other to change the alignment of the foraminations, or apertures in the two members to change the overall opacity of the members. A diffusing member is placed between the open side and the foraminous members to assist in making the light uniform over the entire area to be illuminated.

The invention will be described in greater detail in the following specification together with the drawing in which:

FIG. 1 is a perspective view of a light source constructed according to the invention and with parts broken away to show the interior thereof;

FIG. 2 shows a cross-sectional view of the light source of FIG. 1 to clarify the arrangement of parts therein.

In FIG. 1 the box is defined by a top 11, a side 12, a rear side 13, and a bottom 14. The front is open except for edges 16 and 17 extending inwardly from the sides and an edge 18 extending upwardly from the bottom. These edges cooperate with a downwardly turned lip 19 to form a slot for receiving the slide 21 to be illuminated. Directly behind the slide 21 is a diffusing member 22, which, in this embodiment, is a flat, translucent plate, and is placed there to disperse the light passing through it so as to assist in breaking up any hot spots of illumination.

Behind the diffusing member 22 are two foraminous, opaque members 23 and 24, the first of which is located in a fixed position directly across the path of light to the slide 21, and the other of which is parallel to the first but is movable with respect thereto in a direction parallel to the planes of the two members. Both members are flat plates in the embodiment shown and the movable member 24 slides in guides 26 and 27 extending from the side 12. A similar pair of guides, not shown in this view, extends from the opposite side of the box.

The movable member 24 is connected to a threaded rod 28 which turns in a correspondingly threaded aperture in the top 11 to raise and lower the member. If desired, one or more springs, such as spring 29, may be placed beneath the member 24 to assist in raising it and, by exerting pressure on the member at all times, to smooth out its motion. This, coupled with a fine pitch on the threaded rod 28 permits accurate control of the motion of member 24 and hence of the relative alignment between the foraminations 31 in the member 23 and the foraminations 32 in the member 24.

Behind the movable member 24, and preferably spaced therefrom is the source of illumination. While incandescent lamps may be used, a higher color temperature at less power consumption may be obtained from fluorescent tubes, of which only one tube 33 appears in this figure. In order to utilize as much of the light as possible, and in order to spread the available illumination as evenly as possible, the inner surfaces of the rear 13, as well as the rear portions of the side 12 and the opposite, unshown side, and the top 11 and bottom 14 are made reflective. While this could be done by silvering these surfaces, to do so would probably create concentrated areas of illumination, or hot spots, and it is better to make these surfaces white.

FIG. 2 shows a preferred arrangement of three fluorescent tubes 33–35. These tubes are parallel to each other and substantially equidistant from the slide 21, which means that the tubes 33–35 lie in a plane parallel to the plane of the slide. Having three tubes contributes to the desired evenness of illumination over the surface of slide 21, and making the inner surfaces of the box reflective further assists in making the illumination even. The diffusing member 22 also contributes to the same effect. In the event that a residual unevenness remains, it may be substantially completely eliminated by so spacing the apertures in the foraminous members that less light will be able to pass through those sections which would otherwise have the most light. The same effect may be obtained by making the apertures of different sizes and keeping them evenly spaced. Typically, it is to be expected that slightly greater light intensity would be present directly in front of each of the tubes 33–35, and so, as shown in FIG. 1 the apertures in such locations may be slightly smaller.

It must be noted however, that it would be undesirable so to arrange the apertures that the illumination would be reduced more quickly in one area than another. This may be avoided by elongating the apertures of plate 23 in a direction parallel to the motion of plate 24. In such case the apertures in the plate 24 may be elongated in the perpendicular direction. Of course, the arrangement of apertures specified for plate 23 and the arrangement for plate 24 may be reversed since, normally, the movement of plate 24 from the position of greatest, or even total, opacity to greatest transparency may be very minute if the apertures are correspondingly small.

While this invention has been described in the specific terms of a single embodiment, it will be recognized that other forms may be constructed without departing from the true scope of the invention as defined by the following claims.

What is claimed is:
1. A light source comprising: a flat diffusing plate; a luminous element spaced from one surface thereof to direct light therethrough; opaque means extending from the edges of said plate and enclosing a volume that includes said luminous element, the inner surface of said opaque means being reflective to increase the apparent intensity of said luminous element; a pair of foraminous sheets of opaque material located across the light path between said luminous element and said diffusing plate so that the light travelling along said path strikes said sheets, one of said sheets having foraminations with varying space-size parameters substantially complement- ing the intensity of light reaching said sheet from said luminous element; and means to move one of said sheets with respect to the other to vary the relative alignment of foraminations in said sheets thereby to vary the overall intensity of light passing through said sheets without varying the relative intensity of various color components of the light.

2. A light source comprising: a flat diffusing plate; a luminous element spaced from one surface thereof to direct light therethrough; opaque means extending from the edges of said plate and enclosing a volume that includes said luminous element, the inner surface of said opaque means being reflective to increase the apparent intensity of said luminous element; a pair of foraminous sheets of opaque material located across the light path between said luminous element and said diffusing plate so that the light travelling along said path strikes said sheets, one of said sheets having foraminations with varying space-size parameters substantially complementing the intensity of light reaching said sheet from said luminous element, the other of said sheets having foraminations with uniform space-size parameters, and means to move the other of said sheets with respect to said one sheet to vary the relative alignment of foraminations in said sheets thereby to vary the overall intensity of light passing through said sheets without varying the relative intensity of various color components of the light.

3. A light source comprising: a flat, diffusing plate; a plurality of fluorescent lights lying in a plane spaced from said plate and parallel thereto to direct light therethrough; opaque means extending from the edges of said plate and enclosing a volume that includes said lights, said opaque means having a reflective surface facing said lights to increase the apparent intensity thereof; a first opaque, stationary, foraminous sheet across the path of light from said lights to said diffusing plate; a second opaque, movable, foraminous sheet across the path of light from said lights to said diffusing plate, one of said sheets having foraminations arranged in rows parallel to said fluorescent lights with the foraminations in rows directly opposite each of said lights being smaller than foraminations in rows substantially midway therebetween; and a threaded rod attached to said movable sheet to move the same to change the alignment of its foraminations with respect to the foraminations of said stationary sheet whereby the intensity of light reaching said diffusing plate from said lights may be controlled.

References Cited by the Examiner
UNITED STATES PATENTS

| | | | |
|---|---|---|---|
| 2,213,382 | 9/40 | Busse | 95—73 |
| 2,300,970 | 11/42 | Riess et al. | 88—24 |
| 2,676,409 | 4/54 | Gamble | 33—1 |
| 2,971,447 | 2/61 | Debrie | 95—73 |

NORTON ANSHER, *Primary Examiner.*
EVON C. BLUNK, *Examiner.*